United States Patent [19]
Betts

[11] Patent Number: 5,850,069
[45] Date of Patent: Dec. 15, 1998

[54] METHOD OF MANUFACTURE AND INSTALLATION FOR A SPRING HANGER REPLACEMENT PAD

[76] Inventor: W. Michael Betts, 123 Requa, Piedmont, Calif. 94611

[21] Appl. No.: 499,119

[22] Filed: Jul. 18, 1995

[51] Int. Cl.⁶ ..................................................... B23K 9/00
[52] U.S. Cl. ..................................... 219/137 R; 29/402.16
[58] Field of Search .............................. 219/137 R, 76.1, 219/76.14; 267/262, 46, 52; 280/718; 29/402.09, 402.13, 402.16, 897.1

[56] References Cited

U.S. PATENT DOCUMENTS

| | | | |
|---|---|---|---|
| 2,747,264 | 5/1956 | Buvelot | 29/402.13 |
| 3,738,631 | 6/1973 | Haley | 267/52 |
| 3,920,264 | 11/1975 | Lafferty | 280/718 |
| 4,175,772 | 11/1979 | Lampert | 280/718 |

*Primary Examiner*—Clifford C. Shaw
*Attorney, Agent, or Firm*—Bruce & McCoy

[57] ABSTRACT

A Method of Manufacture and Installation for a Spring Hanger Replacement Pad including specific steps of hot forming, air cooling, specific welding, and insulated cooling of the welded combination.

5 Claims, 2 Drawing Sheets

METHOD OF MANUFACTURE AND INSTALLATION FOR A SPRING HANGER REPLACEMENT PAD

BACKGROUND OF THE INVENTION

1. Field of the Invention

The present invention relates to spring hanger pads for truck and trailer leaf spring mounts and, more particularly, to a method of manufacture and installation for a spring hanger replacement pad.

2. Description of the Prior Art

Spring steel truck and trailer leaf springs normally have a Rockwell C hardness of 44 to 46. The spring mounting pad in a spring hanger of a truck or trailer is generally made of a mild steel of a Rockwell C hardness of 20 to 24. These soft pads wear out due to friction as the ends of the hard spring slide back and forth a small amount on the spring pad as the spring flexes. Wear is especially severe for haulers of gravel, sand, and dirt.

In order to prolong the life of the trucks and trailers, a replacement pad is sometimes welded to the seat portion of the original pad mounted in the spring hanger. This replacement pad has generally been a piece of relatively soft flat steel stock which is welded at the ends to the spring pad surface. However, as the springs flex during carriage of the load, the pressure point between the spring and the hanger shifts on the pad and causes the welds to crack and the pads to burst off the hanger seat. The replacement pad cure is generally short-lived and requires continual replacement.

SUMMARY OF THE INVENTION

The present invention is a method of manufacture and installation for a spring hanger replacement pad. It includes the steps of hot forming a spring steel replacement pad of approximately Rockwell C hardness 30 to the original size and shape of the spring hanger pad surface which is to be replaced. The pad is welded to the spring hanger and the weld cooled slowly by the use of a high temperature blanket to insulate the weld area from its environment.

OBJECTS OF THE INVENTION

It is therefore an important object of the present invention to provide a method of manufacture and installation for a spring hanger replacement pad.

It is another object of the present invention to provide the specific welding parameters for installing a spring hanger replacement pad on a softer metal spring hanger mount.

And it is yet a further object of the present invention to provide a method of retaining a high Rockwell C hardness of a spring hanger replacement pad through the welding process.

Other objects and advantages of the present invention will become apparent when the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
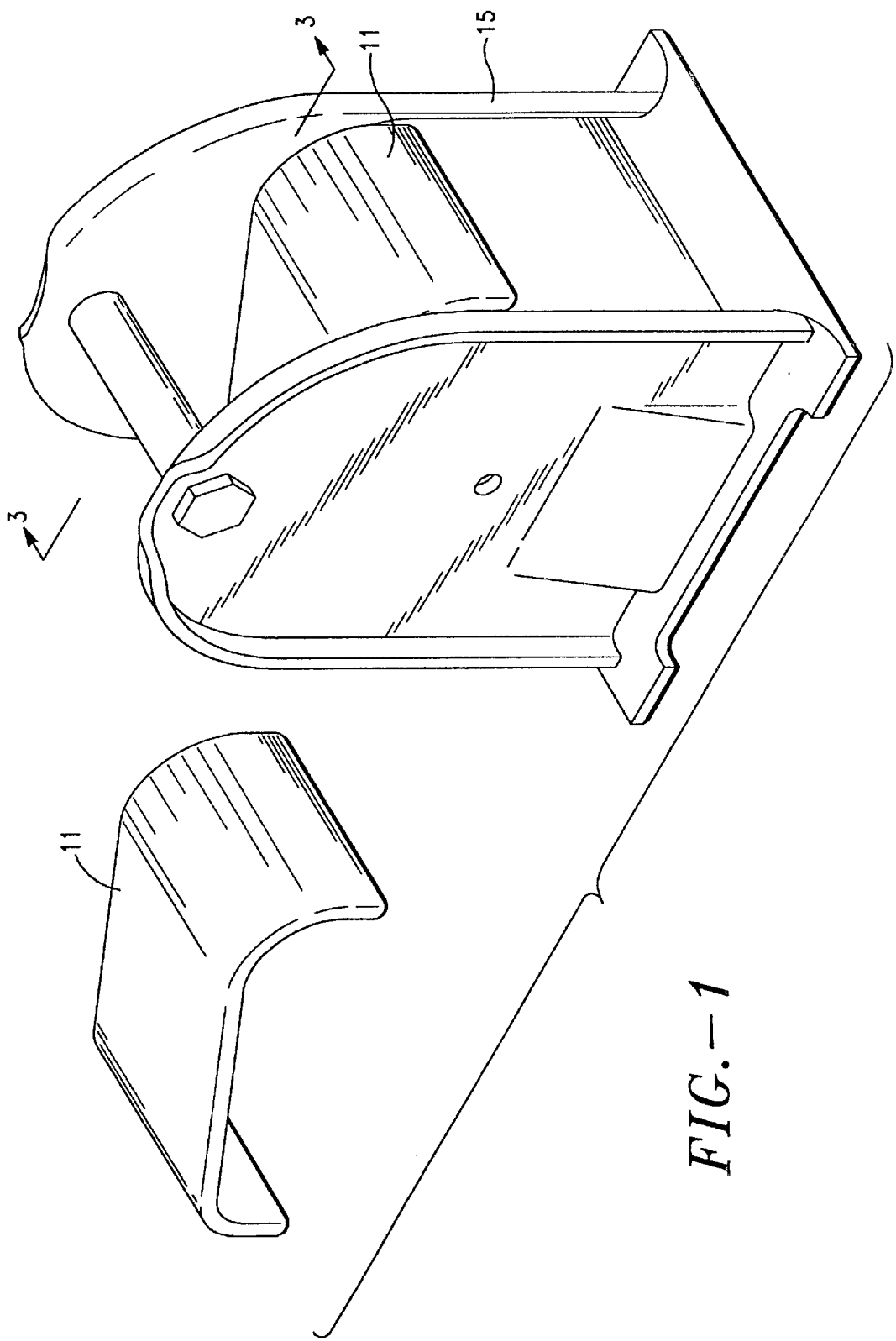
FIG. 1 is a perspective view of a spring hanger with a replacement pad seated thereon and with one removed and displayed apart therefrom.
Figure 2:
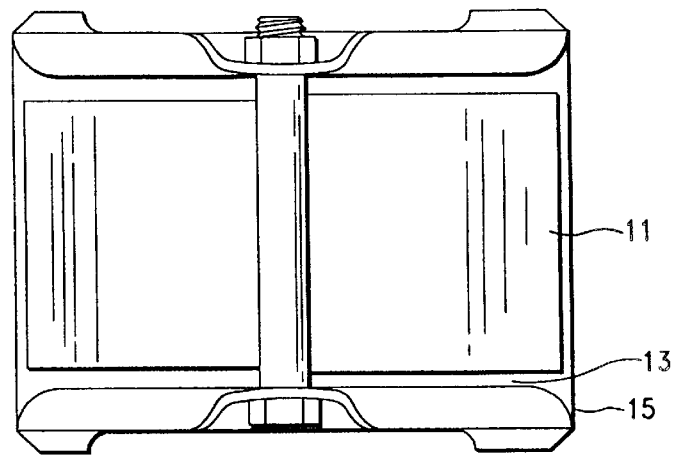
FIG. 2 is a top plan view of FIG. 1.
Figure 3:
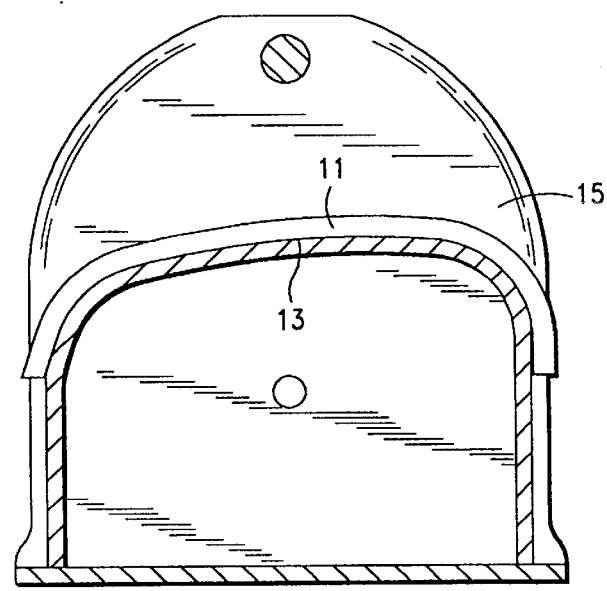
FIG. 3 is a side elevation in cross-section taken along lines 3—3 of FIG. 1.
Figure 4:
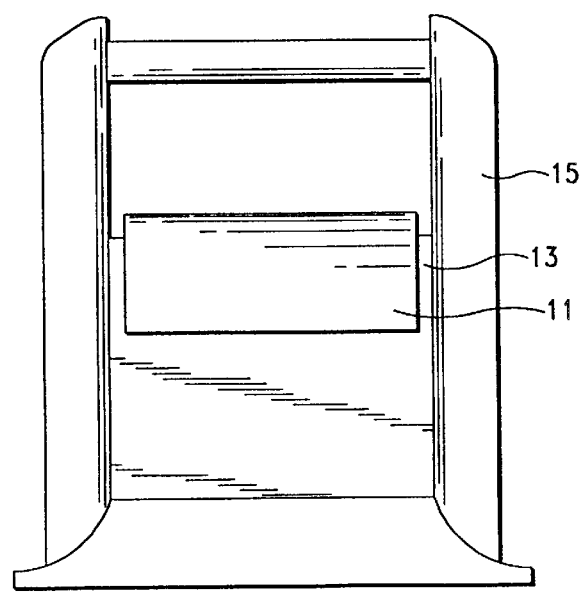
FIG. 4 is an end elevation view of FIG. 1.

The first step of the manufacture of a spring hanger replacement pad 11, illustrated in FIGS. 1–4, includes hot forming a spring steel replacement pad to proximate the original size and shape of the spring hanger pad surface which is to be replaced. Various hanger pad surfaces vary in length, width, and curvature, so the replacement pad must be shaped around a form to achieve the required configuration to mount on top of the original spring hanger surface 13 in the spring hangar mount 15. In the preferred embodiment, a 5160 spring steel is utilized and hot formed around the mold. The formed pad is air cooled to a Rockwell C hardness of approximately 30. Quenching the hot steel would harden it too much and it would be too difficult to weld.

After the replacement pad 11 is hot formed, it is shot peened before it is welded to the hanger surface in order to give it a hardened surface and to clean the replacement pad prior to the welding step which secures the replacement pad to the spring hanger surface.

The replacement pad 11 is welded to the spring hanger mount 15 over the original surface 13 with specific welding parameters and techniques. It is welded with as short of a welding arc as possible using a number of narrow beads and no weave beads. The welding is accomplished with only a sufficient current as is necessary to obtain a smooth arc and proper fusion of the weld metal and base metal. The welding is accomplished using the welding rod manufacturer's welding rod size to amperage setting on the welder. When the weld is completed, it is cooled slowly by the use of a high temperature blanket to insulate the weld area from its environment which might cause too rapid a cooling.

When these specific steps are followed, a hardened replacement pad 11 of a Rockwell C of about 30 can be successfully secured to a softer support to refit a worn out spring hanger mount with a harder surface than was originally employed to resist the abrasion of the very hard spring steel truck or trailer leaf springs.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. A method of manufacture and installation for a spring hanger replacement pad comprising hot forming a spring hanger replacement pad of approximately Rockwell C hardness 30 to the original size and shape of the spring hanger pad surface which is to be replaced, welding said pad to the spring hanger mount, and cooling the weld slowly by use of a high temperature blanket to insulate the weld area from its environment.

2. The method of manufacture and installation of claim 1 wherein a 5160 spring steel is utilized for the replacement pad and the hot formed pad is air cooled to achieve the desired Rockwell C hardness.

3. The method of manufacture and installation of claim 1 wherein the welding of said pad to the spring hanger over the original surface is accomplished with as short a welding arc as possible using a number of narrow beads and no weaved beads, and with only a sufficient current to obtain a smooth arc and proper fusion of all weld metal and base metal, said welding being accomplished utilizing the welding rod manufacturer's welding rod size to amperage settings on the welder.

4. The method of manufacture and installation of claim 1 wherein the hot formed replacement pad is shot peened for hardness and cleanliness prior to being welded in place.

5. The method of manufacture and installation for a spring hanger replacement pad comprising hot forming a 5160 spring steel replacement pad to the original size and shape of the spring hanger pad surface which is to be replaced, air cooling said pad to a Rockwell C hardness of approximately 30, shot peening said hanger pad before welding it to the hanger surface welding said pad to the spring hanger over the original pad surface with as short a welding arc as possible using a number of narrow beads and no weave beads with only a sufficient current to obtain a smooth arc and proper fusion of weld metal to base metal and using the welding rod manufacturer's welding rod size to amperage settings on the welder, and cooling said weld slowly by use of a high temperature blanket to insulate the weld area from its environment.

\* \* \* \* \*